United States Patent [19]
Eberle

[11] Patent Number: 5,503,264
[45] Date of Patent: Apr. 2, 1996

[54] ENDLESSLY CIRCULATING ITEMS TRANSPORTING APPARATUS WITH INDIVIDUAL TRANSPORTING MEMBERS

[75] Inventor: Jurg Eberle, Hinwil, Switzerland

[73] Assignee: Ferag AG, Hinwil, Switzerland

[21] Appl. No.: 266,958

[22] Filed: Jun. 27, 1994

[30] Foreign Application Priority Data

Jul. 7, 1993 [CH] Switzerland .............................. 2040/93

[51] Int. Cl.⁶ ................................................. B65G 29/00
[52] U.S. Cl. ................................ 198/803.01; 198/343.1; 198/792
[58] Field of Search ........................... 198/343.1, 343.2, 198/345.3, 792, 795, 803.01, 465.1, 469.1, 470.1

[56] References Cited

U.S. PATENT DOCUMENTS

| | | |
|---|---|---|
| 2,671,552 | 3/1954 | Miller .................................. 198/343.1 |
| 4,072,228 | 2/1978 | Honegger et al. . |
| 4,201,286 | 5/1980 | Meier . |
| 4,887,809 | 12/1989 | Eberle . |
| 5,007,629 | 4/1991 | Eberle et al. . |
| 5,188,349 | 2/1993 | Honegger . |
| 5,205,392 | 4/1993 | von Seld . |
| 5,280,830 | 1/1994 | Schiaretti et al. ................. 198/795 X |
| 5,306,212 | 4/1994 | Eberle . |
| 5,359,834 | 11/1994 | Holdensgaard et al. ......... 198/465.1 X |

FOREIGN PATENT DOCUMENTS

| | | |
|---|---|---|
| 0557680 | 9/1993 | European Pat. Off. . |
| 2748984 | 5/1979 | Germany . |
| 966402 | 8/1964 | United Kingdom . |

Primary Examiner—James R. Bidwell
Attorney, Agent, or Firm—Bell, Seltzer, Park & Gibson

[57] ABSTRACT

The transporting apparatus has a guide which forms a closed loop and in which transporting members circulate. The transporting members are driven at the beginning and end of the effective conveying zone by in each case an independently controllable drive mechanism. Between successive transporting members there are in each case spring elements, which are designed exclusively for the transfer of compressive force. The drive means of the drive mechanisms driving the transporting members are preceded by controlled blockers, by which the transporting members are prevented from being taken along by the drive. As a result it is ensured that each transporting member seizes a printing product, even if there are gaps in the printing products as they are fed to the transporting members, the printing products preferably being fed in imbricated formation. At the delivery point, the delivery of printing products may also be delayed by one or more cycles without stopping the drive. The spring elements allow a differing number of transporting members to be located between the drive mechanisms.

14 Claims, 6 Drawing Sheets

ENDLESSLY CIRCULATING ITEMS TRANSPORTING APPARATUS WITH INDIVIDUAL TRANSPORTING MEMBERS

BACKGROUND OF THE INVENTION

The present invention relates to an endlessly circulating items transporting apparatus having a number of transporting members which circulate in a guide, with the transporting members being driven and positioned at the beginning and end of their effective conveying zone by independently controllable drive mechanisms. The apparatus is particularly useful for the transfer of printing products, and a conveying device utilizing such a transporting apparatus is also disclosed.

An items transporting apparatus of this type is disclosed in EP-A-0 309 702 and the corresponding U.S. Pat. No. 4,887,809. This apparatus has an endless guide, on which a number of transporting members are guided in a sliding manner. The transporting members are connected to one another by means of a toothed belt, which is deformed in an undulated form by fastening elements arranged on the transporting members. At the beginning and end of the effective conveying zone there are arranged cam plates, which are each connected to their own drive and the cams of which act on the transporting members in order to drive the latter in the beginning and end region of the effective conveying zone and position them with respect to one another. The spacing of the transporting members outside the effective area of the cam plates is compensated by the resilience of the toothed belt deformed in an undulated manner. Differences in the take-over cycle and delivery cycle or in their phase relationship are offset by increasing or reducing the distance between the transporting members. In the case of this known transporting apparatus, with each cycle the cam plates respectively take along the next-following transporting member in a positionally appropriate manner.

If at the beginning of the effective conveying zone there is no printing product ready to be taken on by a transporting member, the latter continues to run, maintaining the gap in the stream of printing products. Analogously it is not possible with the known transporting apparatus to hold back the delivery of a printing product.

A further similarly acting transporting apparatus is known from Swiss Patent No. 610276 and the corresponding U.S. Pat. No. 4,072,228. Here, the transporting members are connected to one another by means of drag connections and their drive takes place by means of worm wheels which, at the beginning and end of the effective conveying zone, act on follow-up rollers arranged on the transporting members. The driving speed of the first worm wheel is determined by the cycle of a supply conveyor feeding the printing products and that of the second worm wheel is determined by a removal conveyor.

A further transporting apparatus for sheet-like products is disclosed in British Patent No. 966,402. This has a guide which is arranged in a vertical plane, forms a closed loop and along which mutually independent transporting members circulate. Arranged in a region of the guide directed downstream, seen in the circulating direction, is a controllable block which in each case holds back a transporting member until a sheet-like product introduced into the gripper of the transporting member releases the block. Due to gravity, the relevant transporting member then moves with the sheet-like product to the end of the effective conveying zone, where the transporting member is taken up by a transporting chain driven in a circulating manner, in order to be brought along the rising section of the guide at the highest point of the circulating path. At the end of the effective conveying zone, the gripper of the transporting member is opened by means of a link in order to deliver the sheet-like product. It is indeed ensured by this apparatus that each transporting member takes over a sheet-like product at the beginning of the effective conveying zone in order to transport it further. However, a cyclically controlled delivery at the end of the effective conveying zone is not possible.

DE-A-28 22 060 and the corresponding U.S. Pat. No. 4,201,286 further disclose a transporting apparatus with a chain which runs along the guide, is driven in a circulating manner and on to which cyclically controlled transporting members are coupled by means of a transfer wheel at the beginning of the effective conveying zone. The transfer wheel is driven in time with a supply conveyor, which delivers printing products in imbricated formation and introduces them into the opened gripper of the transporting member taken up by the transfer wheel. Arranged at the end of the effective conveying zone is a cam wheel, which is coupled to a removal conveyor and in each case takes along a transporting member in order to transfer the printing product to a gripper of the removal conveyor. The mutually independent transporting members are designed in such a way that the coupling to the drive chain is released as soon as transporting members run one onto the other. The transfer wheel is preceded by a controllable blocking element, which holds back over one cycle that transporting member to which a missing printing product in the imbricated formation would be allocated. As a result, no empty grippers can be taken up by the transfer means and further conveyed. A similar blocking element precedes the cam wheel, in order to interrupt temporarily the delivery of printing products to the removal conveyor. This known transporting apparatus is complex in construction and is suitable only for substantially rectilinear conveying zones.

SUMMARY OF THE INVENTION

On the basis of this prior art, it is an object of the present invention to provide an items transporting apparatus of the generic type which, while of simple construction, allows conveying zones shaped as desired within broad limits and which permits at the beginning of the effective conveying zone the closing of gaps and at the end of the effective conveying zone the forming of gaps in the stream of items.

The above and other objects and advantages of the present invention are achieved by the provision of an endlessly circulating transporting apparatus which has a guide in the form of a closed loop and defines a take-over point and a delivery point, plural transporting members which are configured to circulate in the guide along an effective conveying zone between the take-over point and the delivery point, a first drive mechanism located at the takeover point and a second independently controllable drive mechanism located at the delivery point. Each of the drive mechanisms comprises a drive means and means for selectively preventing the transporting members from being taken along the drive means, and spring elements are respectively arranged between successive transporting members, wherein the spring elements are capable of transferring only compressive forces between successive transporting members.

According to the invention, the spring elements are designed for the exclusive transfer of compressive force between the transporting members. Consequently they cannot exert any tensile force on the transporting members. The latter are consequently independent of one another in the drawing direction. This allows the driving of a transporting member by means of drive means of a drive mechanism and the simultaneous holding back of the following transporting member, seen in the circulating direction. The spring elements transfer the drive force from transporting members driven directly by the drive means to transporting members preceding the latter in the circulating direction. As a result, great accelerations are avoided, which results in smooth running. Furthermore, the spring elements allow a great difference in the number of transporting members respectively located between the drive mechanisms. This allows variation of the take-over cycle and delivery cycle within broad limits. Since a transfer of purely compressive force between the transporting members does not require a fixed connection, the guide may have any desired curves with small radii of curvature.

A particularly preferred simple embodiment of the transporting apparatus according to the invention utilizes a blocking element preceding the drive means which can selectively prevent the transporting members from being taken along by the drive means. The taking along of transporting members by the drive means is prevented in a simple way by a controllable blocking element.

Particularly smooth running of the transporting apparatus is achieved through the additional use of a non-return stop following the drive means for preventing the running back of transporting members into the effective area of the drive means if the following transporting member is driven with a delay. Consequently, a section of the guide following the drive mechanisms, as seen in circulating direction U, can readily have a gradient.

A particularly simple, positionally appropriate driving of the transporting members is achieved through the use of drive means having toothed drive elements which, when driven in a circulating manner, mesh with tooth-like driving members which are provided on the transporting members.

In a further, particularly preferred embodiment of the transporting apparatus according to the invention the toothed drive elements of the drive means have chains which are led around sprockets. Drive parts designed in a shackle-like manner engage over a plurality of chain links with the drive parts being arranged one behind the other on the chain. The guide runs along a drive section of the path of drive part movement and two successive drive parts bound a tooth gap in the drive section such that the tooth gap can receive a driving member of one of the transporting members. It permits the driving of the transporting members in a drive section which has both straight sections and curved sections. The position of the transporting members is in each case precisely defined in the region of this drive section, which ensures the flexibility with respect to the take-over and delivery of the items. Moreover, the spacing of the transporting members can be varied within broad limits by the size of the drive members. Since the latter are designed in a shackle-like manner, they can compensate without any problem for the difference in the rectilinearly measured distance between the points of articulation to the chain in the region of the wheels and the straight region between the wheels.

The movement of the transporting members is damped in a preferred way through the provisions of a belt-like guiding and damping element which loosely passes through the transporting members and forms a closed loop which runs along the guide. If there are differences in speed between the transporting members and the damping element, frictional forces occur since the damping element is guided on the transporting members.

To achieve particularly reliable guidance of the damping element in the region of the drive mechanisms, even where no transporting members are in engagement with the drive elements, each drive part has on each side of the chain a driving shackle and the guiding and damping element runs between the driving shackles in the drive section.

The use of a damping element of elastomeric and abrasion-resistant material is of particular advantage. By pre-stressing the damping element, different damping effects can be achieved.

Particularly simple guidance of the spring elements is ensured in a particularly preferred embodiment which utilizes helical compression springs which loosely engage around the guiding and damping element. Helical compression springs which are extremely long with respect to their diameter can be used without said springs buckling under compressive loading.

Moreover, multipart helical compression springs and/or helical compression springs which are separate from the transporting members can be used.

Particularly smooth running of the transporting apparatus according to the invention can be achieved by arranging the damping members between the spring elements and the transporting members. Preferably, the spring elements are fastened on the transporting members. These are effective in particular whenever spring elements and transporting members run one onto the other.

By providing the sections of the guide which directly precede the drive mechanisms with down gradients, the building up of a supply of transporting members at the drive mechanisms is allowed, even where the latter sections of the guide have gradients between them and there are gaps between transporting members.

A particularly preferred use of the transporting apparatus disclosed above is one where the transporting apparatus is preceded by a supply conveyor for feeding products (particularly printing products) to a take-over point at a first drive mechanism of the transporting apparatus which is synchronized with the supply conveyor. Each transporting member of said transporting apparatus has a controllable gripper which is intended for taking over in each case an item at the take-over point, transporting that item to a delivery point at the second drive mechanism, and transferring them there to a removal conveyor, with control of the second drive mechanism being dependent on the removal conveyor.

BRIEF DESCRIPTION OF THE DRAWINGS

The invention is now described in more detail with reference to an illustrative embodiment represented in the drawings, in which purely diagrammatically.

DETAILED DESCRIPTION OF THE DRAWINGS

Figure 1:
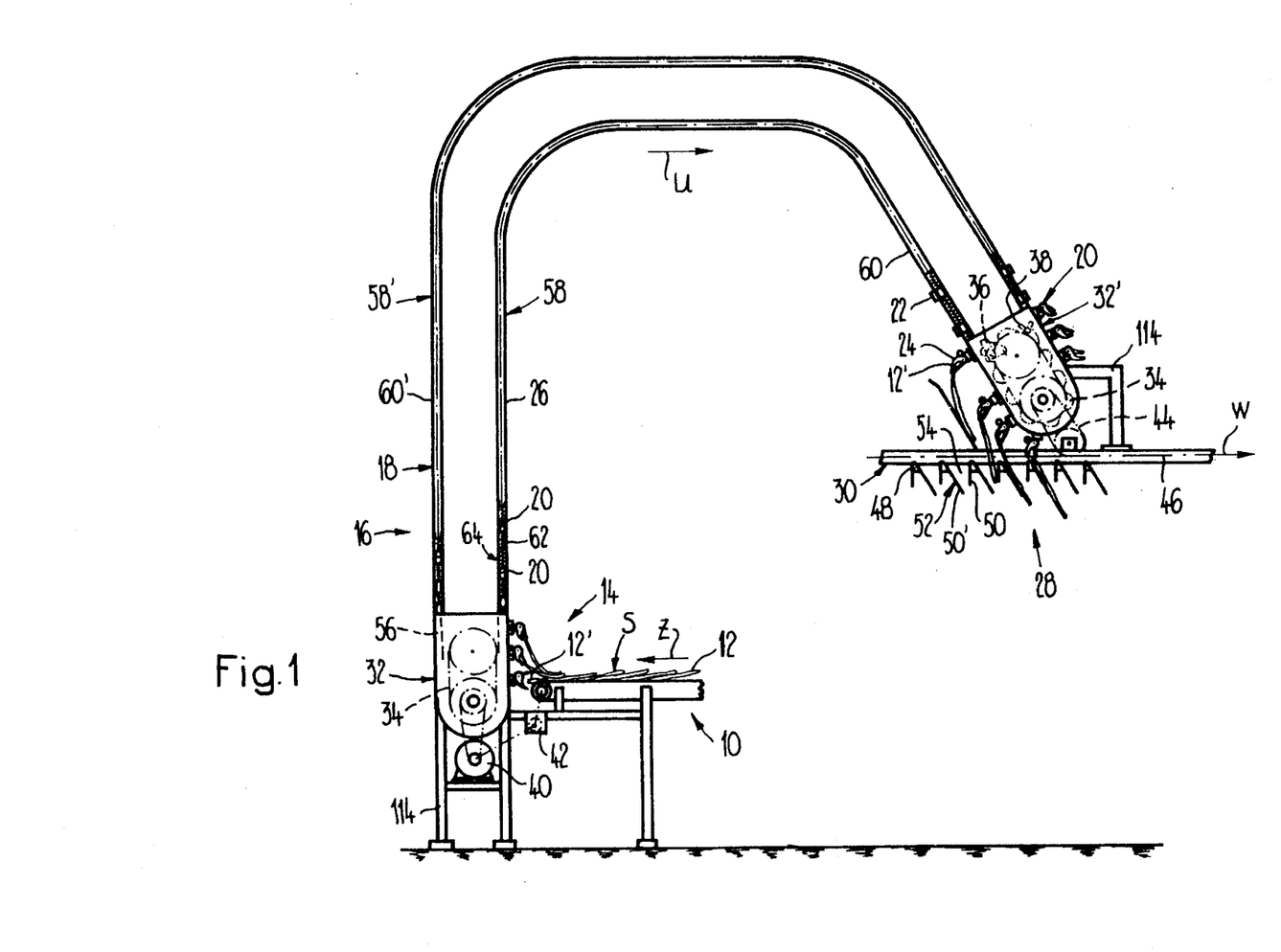
FIG. 1 shows in elevation a conveying device with a supply conveyor, a removal conveyor and an endlessly circulating items transporting apparatus for transporting the printing products fed by the supply conveyor to the removal conveyor.

The conveying device shown in FIG. 1 has a supply conveyor 10, which is designed as a belt conveyor and is intended for feeding printing products 12 in feeding direction Z to a take-over point 14 of a transporting apparatus 16. At the end of the supply conveyor 10, running in a horizontal direction, there runs past in a vertical direction a guide 18 of the transporting apparatus 16, in which a multiplicity of transporting members 20 are arranged one behind the other and circulate in circulating direction U. The latter runs from a downward direction into an upward direction at the take-over point 14.

Each transporting member 20 has a carriage 22, which is guided freely movably in the channel-like guide 18 and which bears a controllable gripper 24. The latter is intended for taking over at the take-over point 14 a printing product 12, which has been fed by the supply conveyor 10, and conveying it along the effective conveying zone 26 to a delivery point 28 and transferring it there to a removal conveyor 30.

At the beginning and end of the effective conveying zone 26, i.e. at the take-over point 14 and delivery point 28, the transporting apparatus 16 has in each case a drive mechanism 32, 32'. These are identically designed and each has: a drive means 34 which is driven in a circulating manner for driving the carriages 22, controlled blocking means 36 preceding said drive means (seen in circulating direction U) for preventing the entry of transporting members 20 into the effective area of the drive means 34, and also a non-return stop 38 following said drive means for preventing the running back of transporting members 20 into the effective area of the drive means 34.

The drive mechanisms 32, 32' are independently controllable. The driving of the drive mechanism 32 at the take-over point 14 takes place by means of a drive motor 40, which at the same time drives the supply conveyor 10. In the connection between the drive motor 40 and the supply conveyor 10 there is an adjustable gearing 42, which is also suitable for setting the phase relationship between the supply conveyor 10 and the drive means 34. The drive means 34 of the drive mechanism 32' at the delivery point 28 is driven by the removal conveyor 30, as is indicated by a chain drive 44.

The removal conveyor 30 has on a drawing member 46 (for example a conveying chain) clips 48 which are arranged one behind the other and which securely hold the mutually facing product halves 50, 50' of a folded printing product 52. The drawing member is driven in a circulating manner in removing direction W. These printing products 52 consequently form at the delivery point 28 upwardly open pockets 54, into each of which a printing product 12 is inserted by means of the transporting apparatus 16. With respect to the construction and mode of operation of the removal conveyor 30, reference is made to EP-A-0 536 514 and the corresponding U.S. Pat. No. 5,188,349.

The guide 18 is formed in the region of the drive mechanisms 32, 32' by groove-like guide channels 56, which are open toward each other, and between the drive mechanisms 32, 32' by cross-sectionally C-shaped guide rails 58, 58'. Seen in circulating direction U, the guide rail 58 adjoins the guide channels 56 of the drive mechanism 32 with a section running in a vertical direction. This is followed by an arc section, which is adjoined by a horizontal section. A following arc section establishes the connection to a straight-running rail section 60, which has (seen in circulating direction U) a down-gradient and leads directly to the guide channel 56 of the drive mechanism 32'. The guide rail 58' runs parallel to the guide rail 58 and has a rail section 60' which is adjacent to the drive mechanism 32 and (seen in circulating direction U) likewise has a down-gradient (shown running in a vertical direction.)

Arranged in each case between two transporting members 20 is a spring element 64, designed as a helical compression spring 62. The helical compression springs 62 are not fastened on the transporting members 20, so that they can transfer compressive forces exclusively.

Figure 2:
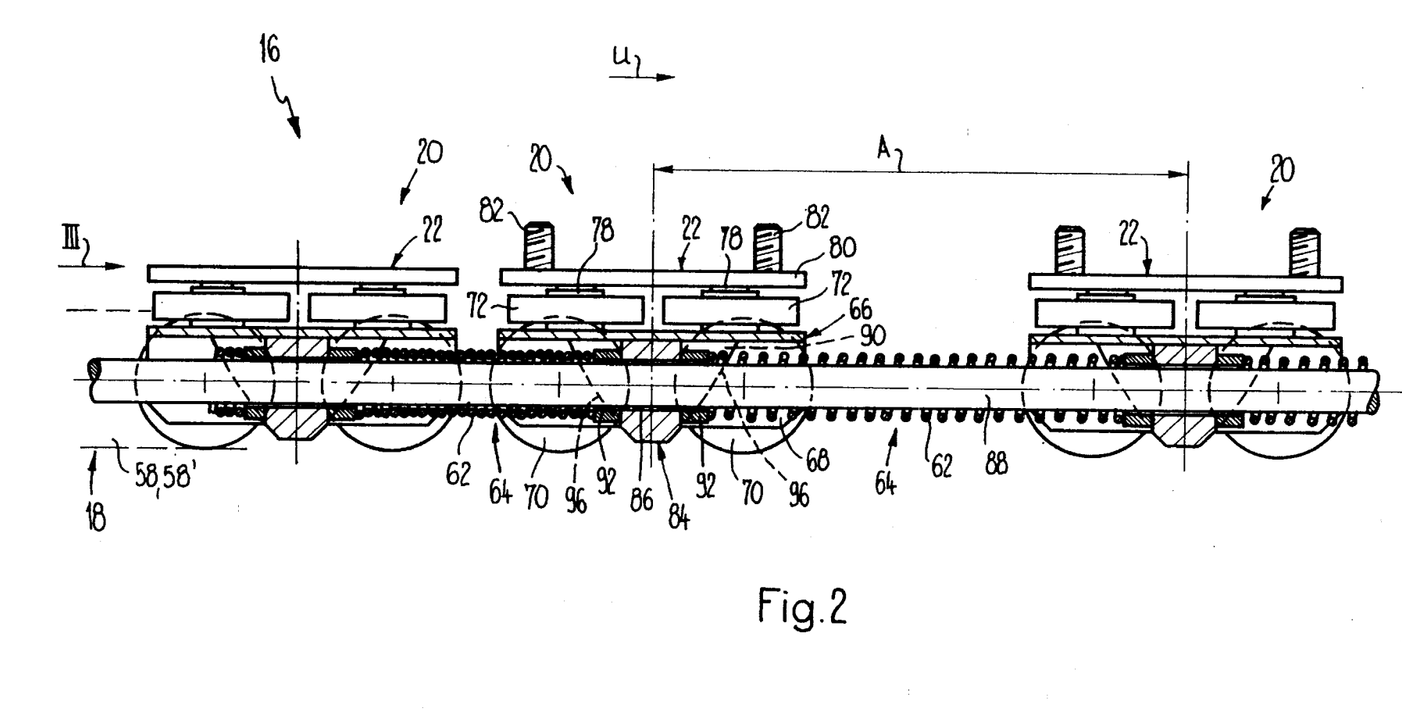
FIG. 2 shows a longitudinal section through carriages of transporting members circulating in a guide of the transporting apparatus.

The construction of the transporting members 20 and the arrangement of the helical compression springs 62 are now described in more detail with reference to FIGS. 2 and 3. Each of the carriages 22 of the transporting members 20 has a cross-sectionally U-shaped chassis 66, on the side flanks 68 of which there are in each case two running rollers 70 mounted freely rotatably. These rollers are guided in the cross-sectionally C-shaped guide rail 58, 58' and, in the region of the drive mechanisms 32, 32', in the guide channels 56. The lateral guidance takes place by in each case two guide rollers 72, which are arranged one behind the other in circulating direction U. The guide rollers engage through the guide slot 74 running in the longitudinal direction of the guide 18, and interact with the mutually facing flank ends 76 bounding said slot. The guide rollers 72 are mounted freely rotatably on carrying spindles 78, which at one end are fastened on the chassis 66 and at the other end bear a fastening plate 80. For fastening the grippers 24, screw shanks 82 protrude from the fastening plate 80.

Fastened on the chassis 66 is a driving body 84, which in longitudinal section is approximately trapezoidal and has a passage 86 running in the longitudinal direction. This passage is passed through loosely by a round belt 88 of elastomeric material of a slightly smaller cross section. The round belt 88 passing through the driving bodies 84 of all the transporting members 20 serves on the one hand for damping the movement of the carriages 22 and on the other hand for guiding the helical compression springs 62, which engage loosely around the round belt 88, and for guiding the carriages 22. The driving bodies 84 have on the rear side and front side, seen in circulating direction U, in each case a groove-like recess 90, the bottom of which, running at right angles to the circulating direction U, forms a supporting face for a sleeve-like damping member 92. The latter is likewise passed through loosely by the round belt 88, is at the one end fastened on the driving body 84 and at the other end is intended for interacting with the end on this side of the corresponding helical compression spring 62. The completely compressed helical compression springs 62 have such a length that the carriages 22 do not touch one another, as is represented in FIG. 2 by the carriage 22 in the middle and the one to the left of it. If the helical compression springs 62 are relaxed and their ends bear against carriages 22, the latter assume a center-to-center distance A, which corresponds approximately to the tooth pitch of the toothed drive elements 94 of the drive means 34, measured on a pitch circle coaxial to the chain sprocket 118 (compare FIG. 4). Since the helical compression springs 62 are not fastened on the carriages 22, the latter can of course also assume a greater distance than the center-to-center distance A.

Figure 4:
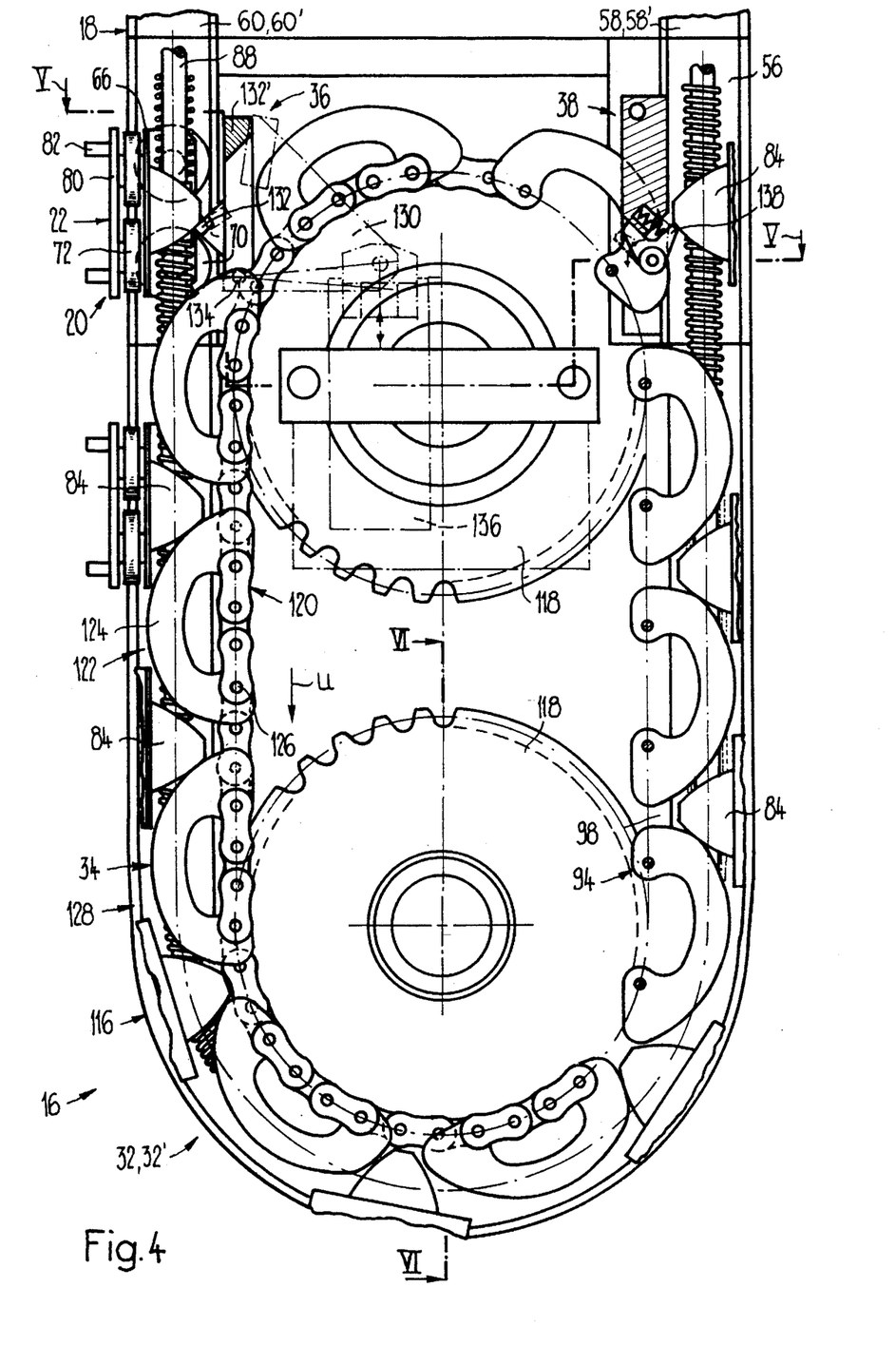
FIG. 4 shows in elevation and partially in section a drive mechanism of the transporting apparatus according to FIG. 1.
Figure 5:
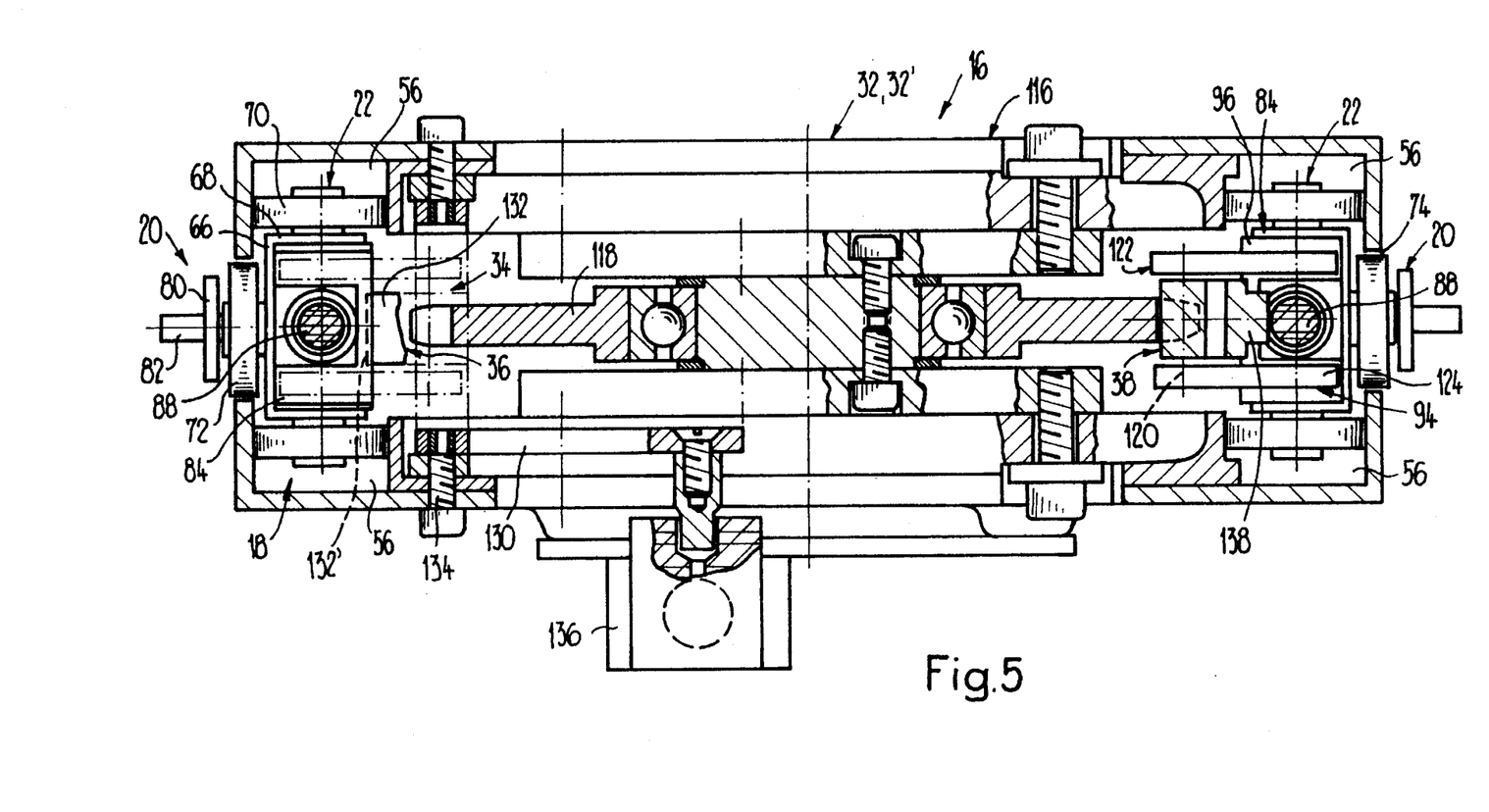
FIG. 5 shows a section along the line V—V of FIG. 4.

The parts of the driving bodies 84 extending on both sides of the recesses 90 up to the side flanks 68 form tooth-like driving members 96, which are intended for engaging in the tooth gaps 98 of the drive elements 94 (compare FIG. 4).

Figure 3:
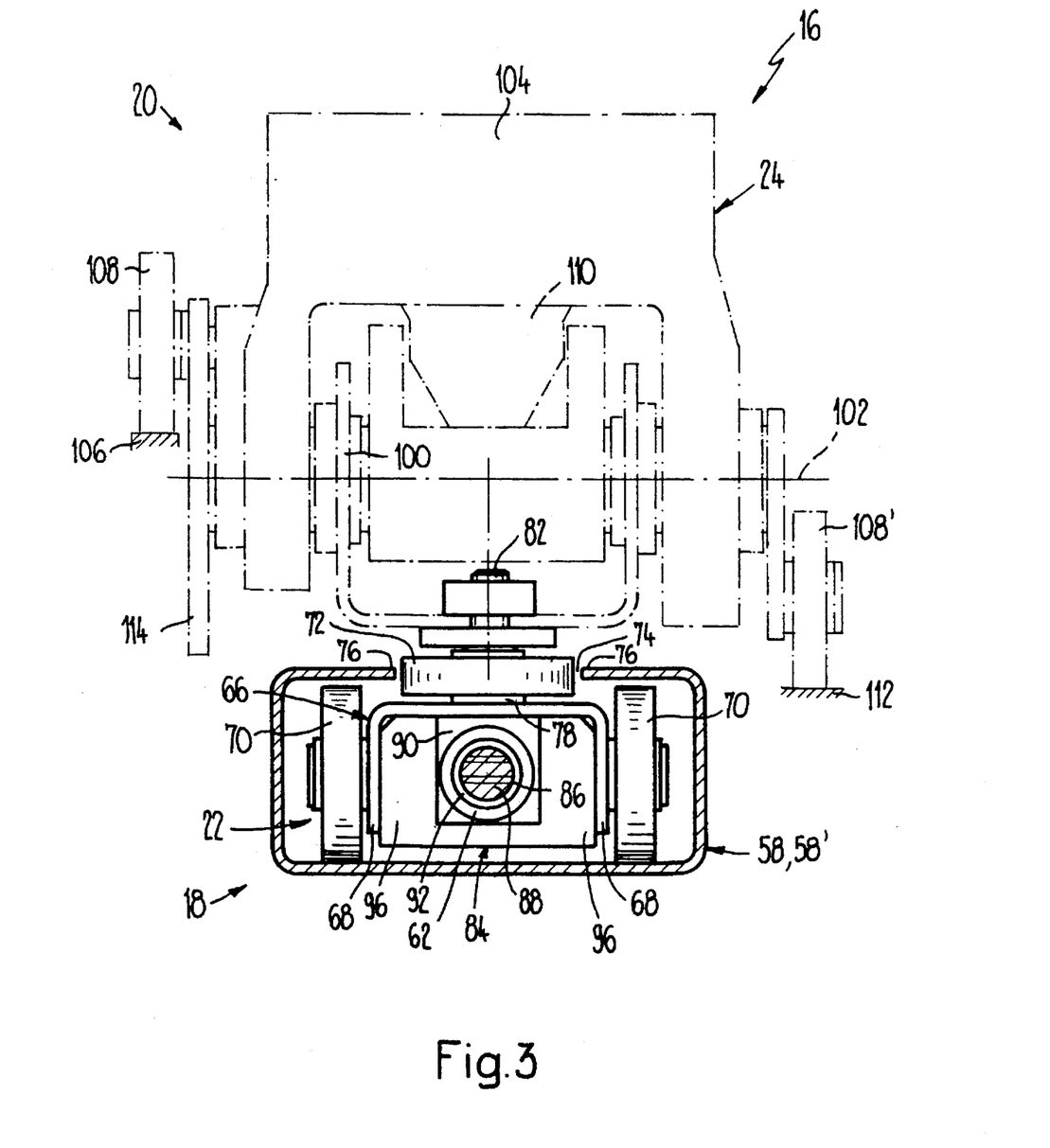
FIG. 3 shows an elevation of FIG. 2 in the direction of arrow III with a gripper fastened on a carriage.

As FIG. 3 shows, the grippers 24, indicated by dot-dashed lines, have a U-shaped carrying arm 100, which is fastened by means of the screw shanks 82 on the fastening plate 80. Mounted freely rotatably on the carrying arm 100 is a shaft 102, which runs at right angles to the circulating direction U, (as indicated by its dot-dashed axis) and on which two gripper jaws 104 are seated freely rotatably. One of these gripper jaws 104 is connected to a control roller 108, interacting with a bearing link 106. The shaft 102 is on the one hand coupled via a lever to a further control roller 108', interacting with a closing link 112, and on the other hand is connected via a spring 110 to the other gripper jaw 104. Furthermore, the gripper 24 has a locking device 114, in order in the closing position with stressed spring 110 to lock the shaft 102 releasably to the gripper jaw 104 connected to the control roller 108. Grippers 24 of this type are disclosed in EP Patent Application No. 93100004.6, now published under No. 0557 680, and the corresponding U.S. patent application No. 08/018,749 and Swiss Patent Application No. 00107/93-2 and the corresponding U.S. patent application No. 08/173,967.

Each of the drive mechanisms 32, 32' has a drive housing 116 fastened on a rack 114. In said housing, two parallel-axis chain sprockets 118 are mounted freely rotatably, one of these chain sprockets 118 being connected for drive purposes to the drive motor 40 or via the chain drive 44 to the removal conveyor 30. Guided around the chain sprockets 118 is a chain 120, on which there are arranged one behind the other drive elements 122 designed in a shackle-like or bow-like manner and in each case engaging over a plurality of chain links. Each drive element 122 has on both sides of the chain 120 a C-shaped driving shackle 124. For fastening on the chain 120, the driving shackles 124 are passed through in their end regions by the relevant chain bolts 126. The pairs of driving shackles, arranged one behind the other, in each case bound a tooth gap 98, which is intended for receiving the driving body 84 or the driving members 96 of the latter in the region of a drive section 128, in which the guide 18 runs along the circulating path of the driving shackles 124. In the drive section 128, the guide 18 and the guide channels 56 run in the form of a U and thus in the region of the two chain strands between the chain sprockets 118 and in the region of the respectively driven chain sprocket 118 they run substantially parallel to the chain 120. In order to reduce the polygonal effect, the guide channels 56 may be shaped in a way corresponding to EP Patent Application No. 92121366.6 or the corresponding U.S. patent application No. 08/002,182, now U.S. Pat. No. 5,306, 212.

Figure 6:
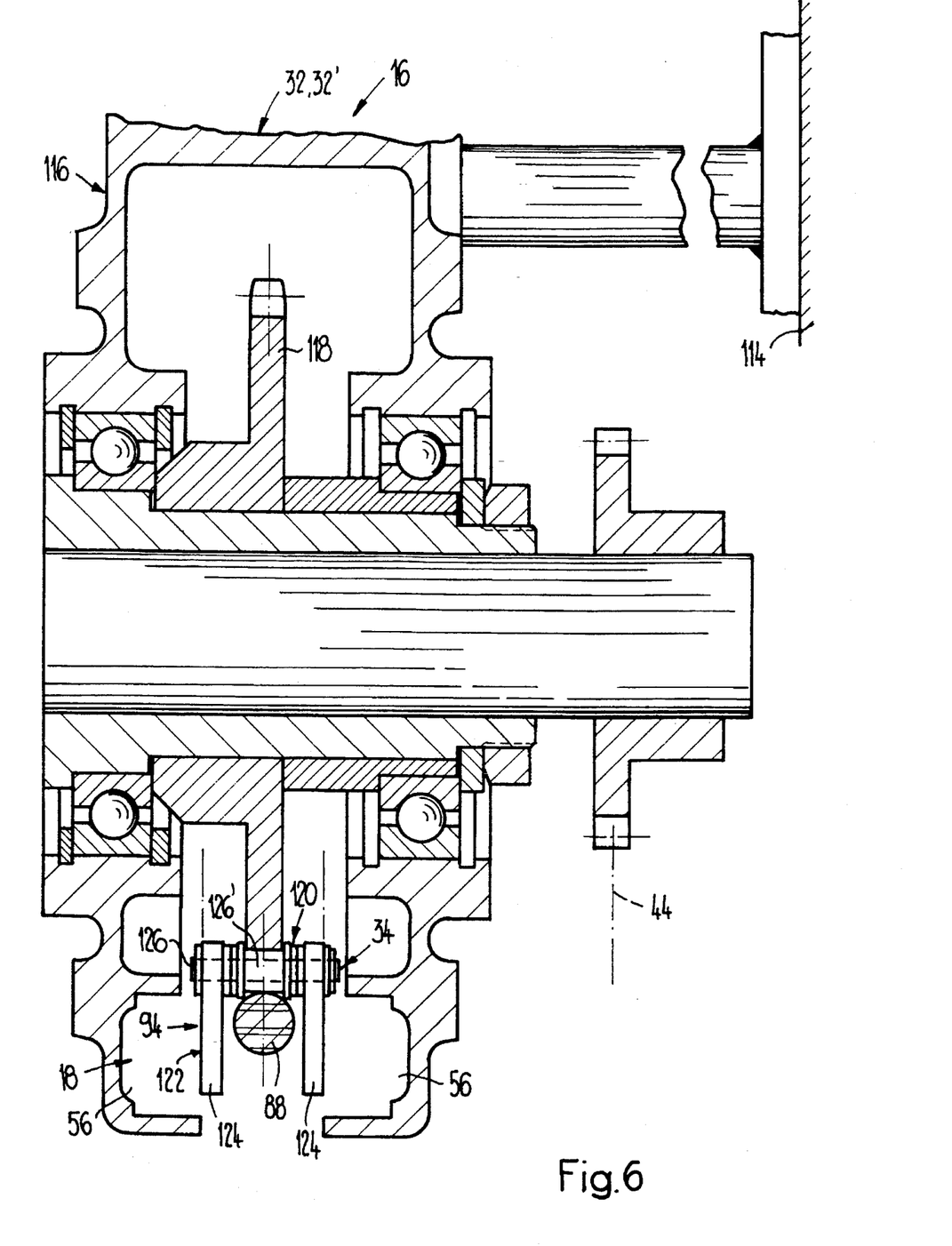
FIG. 6 shows a vertical section, denoted in FIG. 4 by the line VI—VI, through a part of the drive mechanism.

The round belt 88 runs between the driving shackles 124 and, at the deflection around the chain sprocket 118, bears against the chain sleeves 126' if there is a gap between successive transporting members 20 (see FIG. 6). Consequently, even in this case the round belt 88 is securely guided in the region of the drive mechanisms 32, 32'. The driving shackles 124 preferably consist of plastic and can consequently cope with the variation in the distance between the corresponding chain bolts 126 without any problem.

Arranged at the beginning of the drive section 128 are the blocking means 36. These have a blocking body 132, fastened on a triangular lever 130. The triangular lever is mounted at the swivel axis 134 and coupled to a fast-action cylinder-piston unit 136. By means of this cylinder-piston unit 136, the blocking body 132 can be swivelled out of a blocking position 132', shown in FIG. 4 by solid lines, into a rest position, indicated by dot-dashed lines, and back again. In blocking position 132', the blocking body 132 lies in the path of movement of the driving bodies 84 and driving body 84 of the relevant transporting member 20 runs into or bears against blocking body 84. This prevents the relevant transporting member 20 from being able to go into the effective area of the drive means 34 and consequently into the effective area of the driving shackles 124. In the rest position, the blocking body 132 is located outside the path of movement of the driving bodies 84, as a result of which the transporting member 20 respectively running past it goes into the effective area of the drive means 34. The position of the transporting member 20 running into the drive section 128 is in this case governed by the helical compression spring 62 between this transporting member 20 and the preceding transporting member 20, the driving members 96 of which are caught in a tooth gap 98. The C-shaped driving shackles 124 and the entry of the driving members 96 into the tooth gaps 98 in the region of the deflection of the driving shackles 124 around the upper chain sprocket 118 in this case readily allow a considerable tolerance in the spacing. For example, in the case of a center-to-center distance of the tooth gaps 98 of 95 mm in the straight region of the chain 120 and of 115 mm at the deflection around the chain sprockets 118, the entry of the driving members 96 of successive transporting members 20 in successive tooth gaps 98 is ensured even if the center-to-center distance of the transporting members 20 is 75 mm with helical compression springs 62 completely compressed and 129 mm with helical compression springs 62 relaxed. The withdrawing of the blocking body 132 out of the blocking position 132' into the rest position takes place in each case in coordination with the movement of the continuously circulating drive means 34, in order to ensure that the released transporting member 20 comes to lie with its driving members 96 in a tooth gap 98, since with transporting members 20 held back by the locking means 36 there is a gap with respect to the preceding transporting member 20 or a distance with respect to the corresponding helical compression spring 62.

Arranged at the end of the drive section 128 is the non-return block 38. It has a swivel-mounted, prestressed pawl 138 which is forced back by the respective running-past driving body 84 of a transporting member 20. After the driving body 84 has run past, the pawl engages behind the driving body 84. As a result it is ensured that the relevant transporting member 20 cannot slide back into the effective area of the drive means 34. It should be mentioned for the sake of completeness that the pawl 138 in each case engages behind the relevant driving body 84 shortly before the driving shackles 124 run off the latter.

The device shown in the figures operates as follows: the supply conveyor 10 transports the printing products in imbricated formation S to the take-over point 14, each printing product 12 resting on the following one. The supply conveyor 10 and the drive mechanism 32 are in this case synchronized in such a way that a printing product 12 runs with the leading edge 12' ahead into each opened gripper 24. The gripper 24 is then closed and the seized printing product 12 is conveyed away upward in circulating direction U and lifted off the following fed printing product 12. During seizing of the printing products 12, the transporting members 20 are in the drive section 128, as a result of which the position and the speed of the grippers 24 is precisely predetermined. The transporting members 20 are then pushed in circulating direction U by the helical compression springs 62 respectively transferring the driving force to the respectively preceding transporting member 20.

If a sensing member then detects a gap in the imbricated formation S, for example because a printing product 12 is missing, the transporting member 20 assigned to this missing printing product 12 is held back by one cycle by activation of the blocking means 36; if a plurality of printing products 12 are missing one after the other in the imbricated formation S, it is held back by the corresponding number of cycles, so that the held-back transporting member 20 can in each case seize the first printing product 12 following the gap. As a result, gaps in the sequence of printing products are closed.

In a way analogous to the taking over of the printing products 12, their delivery at the delivery point 28 takes place. Since here the circulating direction U runs obliquely downward from above, the edge 12' of the printing products 12 held by the grippers 24 is then trailing. They are introduced with the then leading edge ahead opposite the edge 12', into the printing products 52 held open by the clips 48. The drive means 34 of the drive mechanism 32' are synchronized with the removal conveyor 30, so that a printing product 12 is pushed into each printing product 52. By opening of the relevant gripper 24, the pushed-in printing product 12 is then released. If no printing product 12 is being introduced into a printing product 52 or if a printing product 52 is missing in the stream of products of the removal conveyor 30, the blocking means 36 assigned to the drive mechanism 32' is activated in order to hold back the corresponding gripper 24. The blocking means 36 are then released again, in a manner coordinated with the removal conveyor 30, so that the corresponding printing product 12 is introduced into the correct printing product 52.

The difference in the receiving cycle and delivery cycle is taken up by the spring elements 64. The number of transporting members 20 in the region of the effective conveying zone 26 and also in the region of the return zone can consequently be varied considerably without the operational reliability being impaired. It is also possible for gaps to occur between successive transporting members 20, i.e. the helical compression springs 62 do not bear against the carriages 23. Since, however, the rail sections 60, 60' directly preceding the drive mechanisms 32, 32' have downgradients, seen in circulating direction U, there is always a supply of transporting members 20, which run onto the drive mechanism 32, 32' due to gravity. Stressed helical compression springs 62 impart on the transporting member 20 released by the blocking means 36 an accelerating force in addition to the force of gravity, which allows high speeds of the drive means 34.

The movement of the round belt 88 is governed only by the friction against the driving bodies 84. It consequently has a damping and compensating effect on the movement of the transporting members 20.

It should be mentioned for the sake of completeness that the guide 18 may be bent in all directions with small radii and may even have turns or twists. This is made possible in particular by the fact that the transporting members 20 are not connected to one another.

The number of transporting members 20 present is usually chosen such that, with substantially relaxed spring elements, there are no gaps between the latter and the transporting members. However, it is also possible to provide a smaller or a greater number of transporting members 20.

It goes without saying that the supply and removal conveyors may be designed differently. In particular, the removal conveyor may be replaced by a drum-like processing device.

Finally, it should be mentioned that it is also possible to use spring elements 64 or helical compression springs 62 which in the relaxed state result in a center-to-center distance of the transporting members 20 which differs significantly from the center-to-center distance of the tooth gaps 92. In this case, means are to be provided in order to bring the transporting members 20 into a spacing which corresponds to the tooth gaps 92.

That which is claimed is:

1. An endlessly circulating transporting apparatus for transporting items from a first location to a second location comprising:

a guide in the form of a closed loop and defining a take-over point and a delivery point, plural transporting members which are configured to circulate in said guide along an effective conveying zone between said take-over point and said delivery point, a first drive mechanism located at said takeover point and a second independently controllable drive mechanism located at said delivery point, wherein each of said drive mechanisms comprises a drive means and means for selectively preventing said transporting members from being taken along said drive means, and spring elements respectively arranged between successive transporting members, wherein said spring elements are capable of transferring only compressive forces between successive transporting members.

2. The endlessly circulating transporting apparatus as claimed in claim 1, wherein said means for selectively preventing said transporting members from being taken along said drive means comprises a blocking element preceding said drive means wherein said blocking element is movable from a first blocking position where said transporting members are kept from being taken along said drive means to a second rest position, and wherein the movement of said blocking element from said first blocking position to said second rest position can be performed in coordination with said drive means.

3. The endlessly circulating transporting apparatus as claimed in claim 2, further comprising a non-return stop following said drive means, wherein said non-return stop is capable of acting on said transporting members to prevent their return to said drive means.

4. The endlessly circulating transporting apparatus as claimed in claim 1, wherein said drive means include toothed drive elements and said transporting members have tooth-like driving members which are capable of meshing with said toothed drive elements when said toothed drive elements are driven in a circulating manner.

5. The endlessly circulating transporting apparatus as claimed in claim 4, wherein said toothed drive elements comprise chains which are led around sprockets, and shackle-like drive parts arranged on said chains so that each of said drive parts engages over a plurality of chain links, and said guide comprising a drive section along the path of movement of said drive parts, wherein each two successive drive parts bound a tooth gap in the drive section, wherein each of said tooth gaps is capable of receiving a tooth-like driving member of a transporting member.

6. The endlessly circulating transporting apparatus as claimed in claim 5, wherein each of said drive parts has a driving shackle located on each side of said chain, and further comprising a belt-like guiding and damping element which forms a closed loop and runs along said guide, and wherein in said drive section, the belt-like guiding and damping element runs between said driving shackles.

7. The endlessly circulating transporting apparatus as claimed in claim 1, wherein a belt-like guiding and damping element passes through said transporting members, and wherein said belt-like guiding and damping element runs along said guide and forms a closed loop.

8. The endlessly circulating transporting apparatus as claimed in claim 7, wherein said belt-like guiding and damping element consists of an elastic and abrasion-resistant material.

9. The endlessly circulating transporting apparatus as claimed in claim 7, wherein said spring elements comprise helical compression springs which engage loosely around said belt-like guiding and damping element.

10. The endlessly circulating transporting apparatus as claimed in claim 9, wherein said helical compression springs are separate from said transporting members.

11. The endlessly circulating transporting apparatus as claimed in claim 1, further comprising damping members arranged between said spring elements and said transporting members.

12. The endlessly circulating transporting apparatus as claimed in claim 11, wherein said damping members are fastened on said transporting members.

13. The endlessly circulating transporting apparatus as claimed in claim 1, wherein sections of said guide directly preceding said drive mechanisms have down-gradients.

14. The endlessly circulating transporting apparatus as claimed in claim 1, further comprising supply conveyor means for feeding items proximate said takeover cycle and first drive mechanism, and a removal conveyor, and means for synchronizing the movements of said supply conveyor means and said first drive mechanism, and wherein each of said transporting members comprises controllable gripper means for taking over an item at said takeover cycle, transporting said item to said delivery cycle at said second drive mechanism, and transferring said item to said removal conveyer, and means for controlling said second drive mechanism in dependence on said removal conveyor.

* * * * *